United States Patent [19]

Yokota

[11] 4,157,867
[45] Jun. 12, 1979

[54] SINGLE-LENS REFLEX CAMERA

[75] Inventor: Hideo Yokota, Tokyo, Japan

[73] Assignee: Canon Kabushiki Kaisha, Tokyo, Japan

[21] Appl. No.: 838,467

[22] Filed: Oct. 3, 1977

[30] Foreign Application Priority Data

Oct. 6, 1976 [JP] Japan .......................... 51-134531[U]

[51] Int. Cl.$^2$ ...................... G03B 17/04; G03B 19/12
[52] U.S. Cl. .................................. 354/158; 354/152; 354/219
[58] Field of Search ............... 354/158, 152, 154, 219, 354/223-225, 187, 288

[56] References Cited

U.S. PATENT DOCUMENTS

| 3,941,464 | 3/1976 | Waaske | 354/223 X |
| 4,024,554 | 5/1977 | Hayami | 354/154 X |

Primary Examiner—John Gonzales
Attorney, Agent, or Firm—Toren, McGeady and Stanger

[57] ABSTRACT

A compact single-lens reflex camera has a camera dark compartment and a view finder dark compartment, the camera body compartment being provided with an optical aperture in its upper side for allowing light for the view finder to pass and the view finder compartment having an optical aperture in its lower side to allow the view finder light to enter the view finder compartment. The aperture of the view finder compartment is removably attached to the camera body aperture while the camera body dark compartment is capable of fixing the view finder dark compartment to one of its side walls. For photographing, the view finder dark compartment is fixed to the aperture of the camera body compartment. When no photographing is required, the view finder dark compartment can be fixed to the side wall of the camera body compartment to make the camera more easily portable.

3 Claims, 2 Drawing Figures

SINGLE-LENS REFLEX CAMERA

BACKGROUND OF THE INVENTION

1. Field of the Invention

This invention relates to a compact single-lens reflex camera.

2. Description of the Prior Art

Cameras designed for the use of a compact cartridge film which is generally known as 110 type film are aimed at simplification of operation and reduction in size of the cameras for improved portability thereof. To meet such a purpose, the bodies in many of such compact cameras have been formed into a flat box shape for easier insertion into pockets or handbags. On the other hand, it has been desired to make such a compact camera into a single-lens reflex camera because of its advantages such as provision for use of interchangeable lenses or use of a zoom lens, for closeup photographing without parallax.

Conventionally, however, a compact single-lens reflex camera of this type has been provided with a view finder optical system which protrudes from the body of the camera. This detracts from the original purpose of improving the portability of the camera.

SUMMARY OF THE INVENTION

It is a principal object of this invention to provide a compact single-lens reflex camera which solves the above stated problem of the conventional cameras of this type and which thus gives improved portability.

To attain this object, the single-lens reflex camera is composed of a camera body dark compartment and a view finder dark compartment in such a manner that the finder compartment is mounted on the upper surface of the camera body compartment for photographing and can be mounted on a side wall of the of the camera body when no photographing is required.

The above and other objects and features of the invention will appear more fully hereinafter from a consideration of the following description taken in connection with the accompanying drawings.

DETAILED DESCRIPTION OF PREFERRED EMBODIMENT

Figure 1:
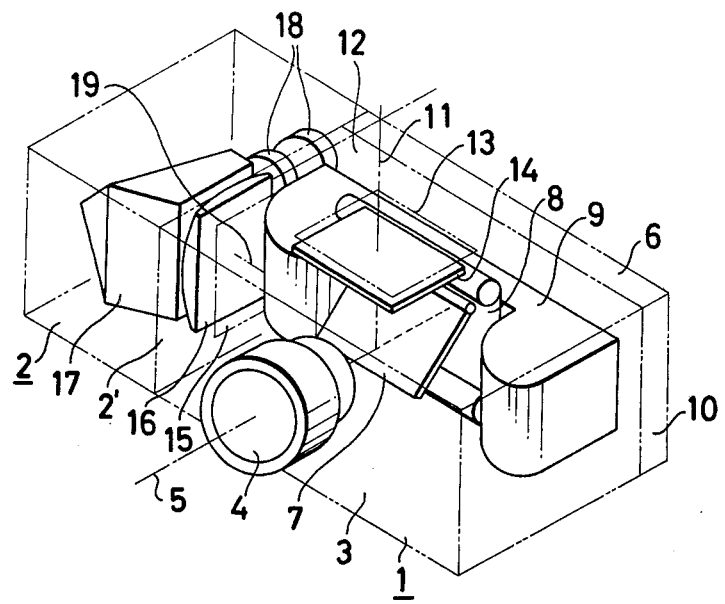
FIG. 1 is an oblique view illustrating the internal structure of the single-lens reflex camera of the invention and FIG. 2 an oblique view of the appearance of the camera illustrating the structural arrangement for moving the view finder compartment.

In FIG. 1, a reference numeral 1 indicates a camera body dark compartment and 2 indicates a view finder dark compartment. Both of these dark compartments are in flat box shapes. When the finder compartment 2 is fixed to one side wall of the camera body compartment, these two compartments form one flat boxlike shape as a whole.

An objective lens 4 is mounted on the front wall 3 of the camera body compartment. The optical axis 5 of the objective lens 4 extends to a rear wall 6 which confronts the front wall 3. A numeral 7 indicates a mirror slanting 45° to divide the optical axis 5. The mirror 7 may be either a semireflecting stationary or a total-reflection mirror that springs up in response to a shutter operation. A numeral 8 indicates a focal plane shutter and 9 indicates a film cartridge, which is inserted into or removed from the compartment 1 through a rear lid 10 provided on the rear wall 6.

An optical axis 11 which is obtained through reflection by the 45° mirror 7 intersects an upper wall 12 of the camera body compartment 1. In the upper wall 12, there is provided an optical aperture 13 which allows a view finder luminous flux to pass. A numeral 14 indicates a focusing screen which is disposed on a plane equivalent to the surface of film.

The bottom wall of the view finder compartment 2 is shown as a side wall in FIG. 1. In the bottom wall, there is provided an optical aperture 15 which introduces a finder luminous flux into the view finder compartment 2. A numeral 16 indicates a condenser lens; 17 indicates a pentagonal prism; 18 indicates an eyepiece; and 19 indicates the optical axis of a view finder optical system. In the condition as illustrated in FIG. 1, the optical axis 19 is perpendicular to the optical axis 5 and 11. Therefore, for photographing, it is necessary to make the optical axis 19 of the view finder coincide with the optical axis 11 through an arrangement as illustrated in FIG. 2.

Figure 2:
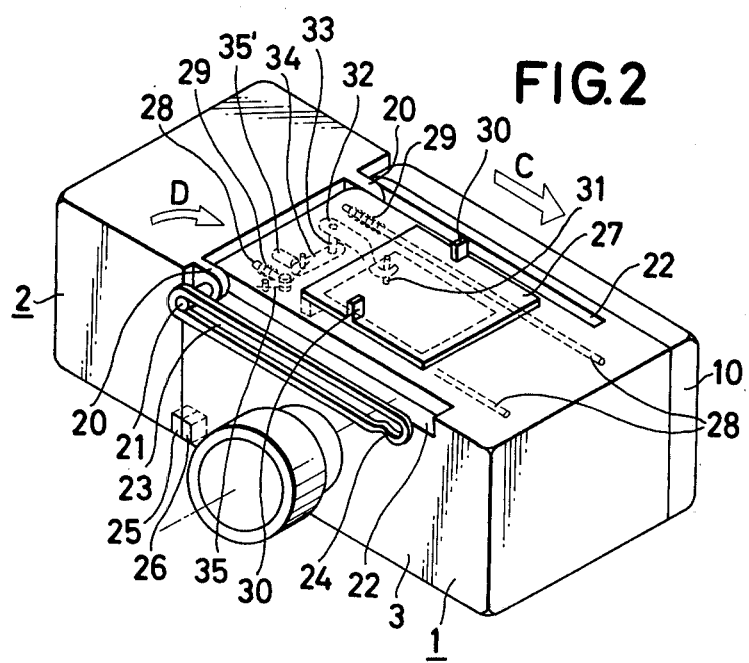

In FIG. 2, a reference numeral 20 indicates arms provided on the view finder compartment 2. One of the arms 20 is provided with a pin 21. A reference numeral 22 indicates guide grooves which allow the arms 20 to move along the upper wall of the camera body compartment 1; and 23 indicates a guide rail arrangement which is secured to the front wall of the camera body dark compartment by means of unillustrated screws or the like with the pin 21 inserted therein to be guided thereby. At the tip of the guide rail arrangement 23, there is provided a spring portion which makes a detent action. A numeral 25 indicates a magnet which is provided on the view finder dark compartment 2 and which serves to secure the view finder compartment 2 to the camera body compartment 1 in cooperation with a magnet 26 provided on the camera body compartment 1. For photographing, these magnets 25 and 26 are separated from each other by hand; and the compartment 2 is turned on the pins 21 to move it in the direction of an arrow D and then is further moved in the direction of another arrow C along the guide grooves 22. The pin 21 comes to a stop when it rides across the spring portion 24. Through this operation, the optical axes 11 and 19 come to coincide with each other and the compartment 2 is securely mounted on the upper wall 12 of the camera body compartment 1. Further, provision of a magnet on the upper wall 12 of the camera body compartment 1 in such a way as to have it come into contact with the magnet 25 of the compartment 2 makes such mounting more secure.

When an opaque cover 27 is provided on the optical aperture 13 in the upper wall of the camera body dark compartment for protection of the focusing screen 14, the cover 27 must be removed away from the optical path for photographing. For this purpose, a mechanism is provided as illustrated in FIG. 2.

The cover 27 is movable over the upper wall 12 along guides 28 and is pulled by a spring 29 in the direction of the arrow C. Further, on the upper surface of the cover 27, there are provided pins 30 with which the view finder dark compartment 2 comes to engage when it is moved in the direction of the arrow C. Accordingly, the cover 27 is opened as the finder compartment 2 is moved in the direction of the arrow C and is closed to cover the aperture 13 again by the spring 29 as the finder compartment is moved in the direction reverse to the direction of the arrow C.

The cover 27 is locked and unlocked in the following manner: A reference numeral 31 indicates a pin provided on the lower face of the cover 27. The pin 31 engages with a hook 32 to prevent the cover 27 from being inadvertently opened. For this purpose, the hook 32 is secured to a rotating shaft 33, which is rotatably attached to the view finder dark compartment 2. A numeral 34 indicates a piece secured to the rotating shaft 33; and 35' indicates a spring which urges the piece 34 to rotate clockwise on the shaft 33. A pin 35 protrudes from the dark compartment 1 to the outside when the compartment 2 is turned in the direction of the arrow D. Then, this causes the piece 34 and the hook 32 to rotate clockwise to disengage hook 32 from the pin 31. When the view finder dark compartment is brought back to the state as illustrated in FIG. 2, the pin moves to the inside of the dark compartment 1 to cause the piece 34 and the hook 32 to rotate counterclockwise. Then, the hook 32 engages with the pin 31 and the cover 27 is locked.

What is claimed is:

1. A single-lens reflex camera comprising:
   a dark compartment constituting a camera body and having a front portion;
   an objective lens disposed on the front portion of the camera body compartment;
   a film carrier disposed perpendicularly with respect to the optical axis of the objective lens, the film carrier being disposed inside the camera body dark compartment;
   a view finder dark compartment;
   a view finder optical system disposed inside the view finder dark compartment;
   a mirror member disposed inside the camera body compartment for guiding a light from the objective lens to said view finder optical system;
   an optical aperture provided in an outer wall of the camera body dark compartment and disposed in an optical path of the light directed to the view finder optical system to allow the light to emerge out of the camera body dark compartment;
   an optical aperture provided in an outer wall of the view finder dark compartment for introducing the light emerging from the optical aperture of the camera body dark compartment into the view finder dark compartment;
   a first outer surface of said camera body through which an optical opening for the camera body dark compartment is formed;
   guide means for guiding the view finder dark compartment back and forth along the first outer surface and a second outer surface continuous to the first outer surface;
   means provided on the optical opening of the dark compartment for covering the optical opening;
   means for locking the opening of the covering means; and
   means for releasing the locking means when the dark compartment moves from the second outer surface to the first outer surface through which the optical opening is provided.

2. A single-lens reflex camera according to claim 1, wherein there are disposed a pentagonal prism and an eyepiece in the view finder dark compartment.

3. A single-lens reflex camera according to claim 1, wherein the cross sectional area of the section through the camera body parallel to the side wall is substantially equal to the cross sectional area of a section through the view finder parallel with the view finder optical aperture.

* * * * *